US008874267B1

(12) United States Patent
Dolgov et al.

(10) Patent No.: US 8,874,267 B1
(45) Date of Patent: Oct. 28, 2014

(54) AVOIDING BLIND SPOTS OF OTHER VEHICLES

(71) Applicant: Google Inc., Mountain View, CA (US)

(72) Inventors: Dmitri A. Dolgov, Mountain View, CA (US); Christopher Paul Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/150,901

(22) Filed: Jan. 9, 2014

Related U.S. Application Data

(63) Continuation of application No. 13/528,122, filed on Jun. 20, 2012.

(51) Int. Cl.
| | |
|---|---|
| *G05D 1/00* | (2006.01) |
| *G06F 19/00* | (2011.01) |
| *G08G 3/02* | (2006.01) |
| *G05B 19/04* | (2006.01) |
| *G05B 19/18* | (2006.01) |
| *G05B 15/00* | (2006.01) |

(52) U.S. Cl.
CPC .................................... *G05D 1/0088* (2013.01)
USPC ............... 700/255; 701/26; 701/28; 701/519; 701/300; 701/301; 701/302; 701/93; 701/96; 700/253; 700/258

(58) Field of Classification Search
CPC ..................... G01S 2013/9332; G01S 2013/93; G01S 2013/9357; G01S 2013/936; G01S 2013/9321; G01S 2013/9342; G01S 2013/9346; G01S 2013/9353; G01S 13/931; G01S 15/931; G01S 3/8083; G01S 7/52001; G01S 5/18; G08G 1/16; G08G 1/161; G08G 1/164–1/168; G08G 9/02; G08G 5/04; B60Q 1/525; B60Q 9/008; B60W 30/09; B60W 30/08; B60W 30/085; B60W 30/095; B60W 30/0953; B60W 30/0956; B60W 30/14; B60W 30/143; B60W 30/146
See application file for complete search history.

(56) References Cited

U.S. PATENT DOCUMENTS 6,768,944 B2 * 7/2004 Breed et al. .................... 701/301
7,049,945 B2 * 5/2006 Breed et al. .................... 340/435
(Continued)

*Primary Examiner* — Khoi Tran
*Assistant Examiner* — Bao Long T Nguyen
(74) *Attorney, Agent, or Firm* — Lerner, David, Littenberg, Krumholz & Mentlik, LLP

(57) ABSTRACT

Aspects of the disclosure relate generally to detecting and avoiding blind spots of other vehicles when maneuvering an autonomous vehicle. Blind spots may include both areas adjacent to another vehicle in which the driver of that vehicle would be unable to identify another object as well as areas that a second driver in a second vehicle may be uncomfortable driving. In one example, a computer of the autonomous vehicle may identify objects that may be relevant for blind spot detecting and may determine the blind spots for these other vehicles. The computer may predict the future locations of the autonomous vehicle and the identified vehicles to determine whether the autonomous vehicle would drive in any of the determined blind spots. If so, the autonomous driving system may adjust its speed to avoid or limit the autonomous vehicle's time in any of the blind spots.

20 Claims, 15 Drawing Sheets

(56) References Cited

U.S. PATENT DOCUMENTS

| | | | |
|---|---|---|---|
| 7,205,904 B2 * | 4/2007 | Schofield | 340/903 |
| 7,893,819 B2 * | 2/2011 | Pfeiffer et al. | 340/435 |
| 7,899,621 B2 * | 3/2011 | Breed et al. | 701/301 |
| 8,384,534 B2 * | 2/2013 | James et al. | 340/439 |
| 8,615,109 B2 * | 12/2013 | Shimizu | 382/104 |
| 2005/0195383 A1 * | 9/2005 | Breed et al. | 356/4.01 |
| 2007/0150196 A1 * | 6/2007 | Grimm | 701/301 |
| 2007/0219720 A1 * | 9/2007 | Trepagnier et al. | 701/300 |
| 2010/0020170 A1 * | 1/2010 | Higgins-Luthman et al. | 348/135 |
| 2010/0123778 A1 * | 5/2010 | Hada | 348/148 |
| 2010/0214085 A1 * | 8/2010 | Avery et al. | 340/435 |
| 2010/0228482 A1 * | 9/2010 | Yonak | 701/301 |
| 2010/0315215 A1 * | 12/2010 | Yuda | 340/435 |
| 2013/0238181 A1 * | 9/2013 | James | 701/23 |

* cited by examiner

AVOIDING BLIND SPOTS OF OTHER VEHICLES

CROSS REFERENCE TO RELATED APPLICATION

This application is a continuation of U.S. patent application Ser. No. 13/528,122, filed on Jun. 20, 2012, the entire disclosure of which is incorporated herein by reference.

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

The primary function of these vehicles is maneuvering themselves in a safe manner in order to protect drivers, passengers, and other objects external to the vehicle. Typically, an autonomous or semiautonomous will use various sensors to identify and avoid vehicles and objects that are ahead of the vehicle and currently in or moving into the same lane or some location through which the autonomous vehicle expects to drive within a short period of time.

However, in addition to keeping drivers and passengers safe, it is also important to provide these individuals with a sense of safety. For example, while an autonomous vehicle may be able to maneuver itself safely while in another vehicle's blind spot, this may be uncomfortable to a driver or a passenger. In this regard, the "blind spot" of a vehicle may be any location which would be considered by an individual to be an unnatural, unnerving, or uncomfortable position relative to another vehicle and not simply a relative position of poor visibility.

BRIEF SUMMARY

One aspect of the disclosure provides a method. The method includes receiving sensor data collected along a roadway; detecting objects in the roadway based on the sensor data; identifying, from the detected objects, a set of objects that are relevant for blind spot detection; for each identified object of the set of identified objects, determining a blind spot area that defines a space in an adjacent lane to a particular identified object of the set of identified objects to be avoided; predicting future locations of the set of identified objects and the vehicle; determining whether the predicted future locations indicate that the vehicle would drive in any of the determined blind spot areas; when the predicted future locations indicate that the vehicle would drive in any of the determined blind spot areas, determining, by a processor, a controlling factor for each determined blind spot area; and maneuvering the vehicle based on the controlling factors.

In one example, the method also includes, for each determined object, determining a set of estimated characteristics, including one or more of the size, shape, location, and type of object. In this example, identifying the set of objects is based on the estimated characteristics of each determined object. In addition or alternatively, determining the blind spot area for a particular object is based on the estimated characteristics of the particular object.

In another example, determining whether the predicted future locations indicate that the vehicle would drive in any of the determined blind spots includes determining whether the vehicle would pass through a portion of the blind spot area for more than a threshold period of time. In a further example, each controlling factor include a set of constraints and the method further comprises inputting the set of constraints of each controlling factor into a speed algorithm to determine speed control for the vehicle. In this example, maneuvering the vehicle is further based on the determined speed control.

Another aspect of the disclosure provides a device. The device includes a processor configured to receive sensor data collected along a roadway; detect objects in the roadway based on the sensor data; identify, from the detected objects, a set of objects that are relevant for blind spot detection; for each identified object of the set of identified objects, determine a blind spot area that defines a space in an adjacent lane to a particular identified object of the set of identified objects to be avoided; predict future locations of the set of identified objects and the vehicle; determine whether the predicted future locations indicate that the vehicle would drive in any of the determined blind spot areas; when the predicted future locations indicate that the vehicle would drive in any of the determined blind spot areas, determine a controlling factor for each determined blind spot area; and generate instructions for maneuvering the vehicle based on the controlling factors.

In one example, the processor is further configured to, for each determined object, determine a set of estimated characteristics, including one or more of the size, shape, location, and type of object. In this example, the processor is further configured to identify the set of objects based on the estimated characteristics of each determined object. In addition or alternatively, the processor is further configured to determine the blind spot area for a particular object based on the estimated characteristics of the particular object.

In another example, the processor is further configured to determine whether the predicted future locations indicate that the vehicle would drive in any of the determined blind spot by determining whether the vehicle would pass through a portion of the blind spot area for more than a threshold period of time. In a further example, each controlling factor includes a set of constraints, and the processor is further configured to incorporate the set of constraints of each controlling factor into a speed algorithm in order to determine speed control for the vehicle. In this example, the processor is further configured to generate the instructions for maneuvering the vehicle based on the determined speed control.

A further aspect of the disclosure provides a non-transitory, tangible computer-readable storage medium on which computer readable instructions of a program are stored. The instructions, when executed by a processor, cause the processor to perform a method. The method includes receiving sensor data collected along a roadway; detecting objects in the roadway based on the sensor data; identifying, from the detected objects, a set of objects that are relevant for blind spot detection; for each identified object of the set of identified objects, determining a blind spot area that defines a space in an adjacent lane to a particular identified object of the set of identified objects to be avoided; predicting future locations of the set of identified objects and the vehicle; determining whether the predicted future locations indicate that the vehicle would drive in any of the determined blind spot areas; when the predicted future locations indicate that the vehicle would drive in any of the determined blind spot areas, determining a controlling factor for each determined blind spot area; and maneuvering the vehicle based on the controlling factors.

In one example, the method also includes, for each determined object, determining a set of estimated characteristics, including one or more of the size, shape, location, and type of object. In this example, identifying the set of objects is based on the estimated characteristics of each determined object. In addition or alternatively, determining the blind spot area for a particular object is based on the estimated characteristics of the particular object.

In another example, determining whether the predicted future locations indicate that the vehicle would drive in any of the determined blind spots includes determining whether the vehicle would pass through a portion of the blind spot area for more than a threshold period of time. In a further example, each controlling factor include a set of constraints, and the method further comprises inputting the set of constraints of each controlling factor into a speed algorithm to determine speed control for the vehicle.

DETAILED DESCRIPTION

In one aspect of the disclosure, an autonomous (or semi-autonomous) vehicle may be maneuvered along a roadway collecting sensor data from the vehicle's environment. The sensor data may be used to detect objects in the roadway. A set of objects that are relevant for blind spot detection may be identified from the detected objects. For each identified object of the set of identified objects, a blind spot area may be determined. This blind spot area may be based on the estimated characteristics of the object from the sensor data, such as the size, shape, location, type, etc.

The future locations of the set of identified objects and the vehicle may be predicted. Using the predicted future locations, whether the vehicle would drive in any of the determined blind spots may be determined. Driving in the determined blind spot may involve determining whether the vehicle would pass through all or a portion of the blind spot area more than some maximum or threshold period of time. When the vehicle would drive in any of the determined blind spot areas, a controlling factor may be determined for each determined blind spot area. Again these controlling factors may be a set of constraints or penalties which are input into a speed algorithm for controlling the speed of the vehicle. The vehicle is then maneuvered based on the controlling factors, for example, the output of the speed algorithm.

Figure 1:
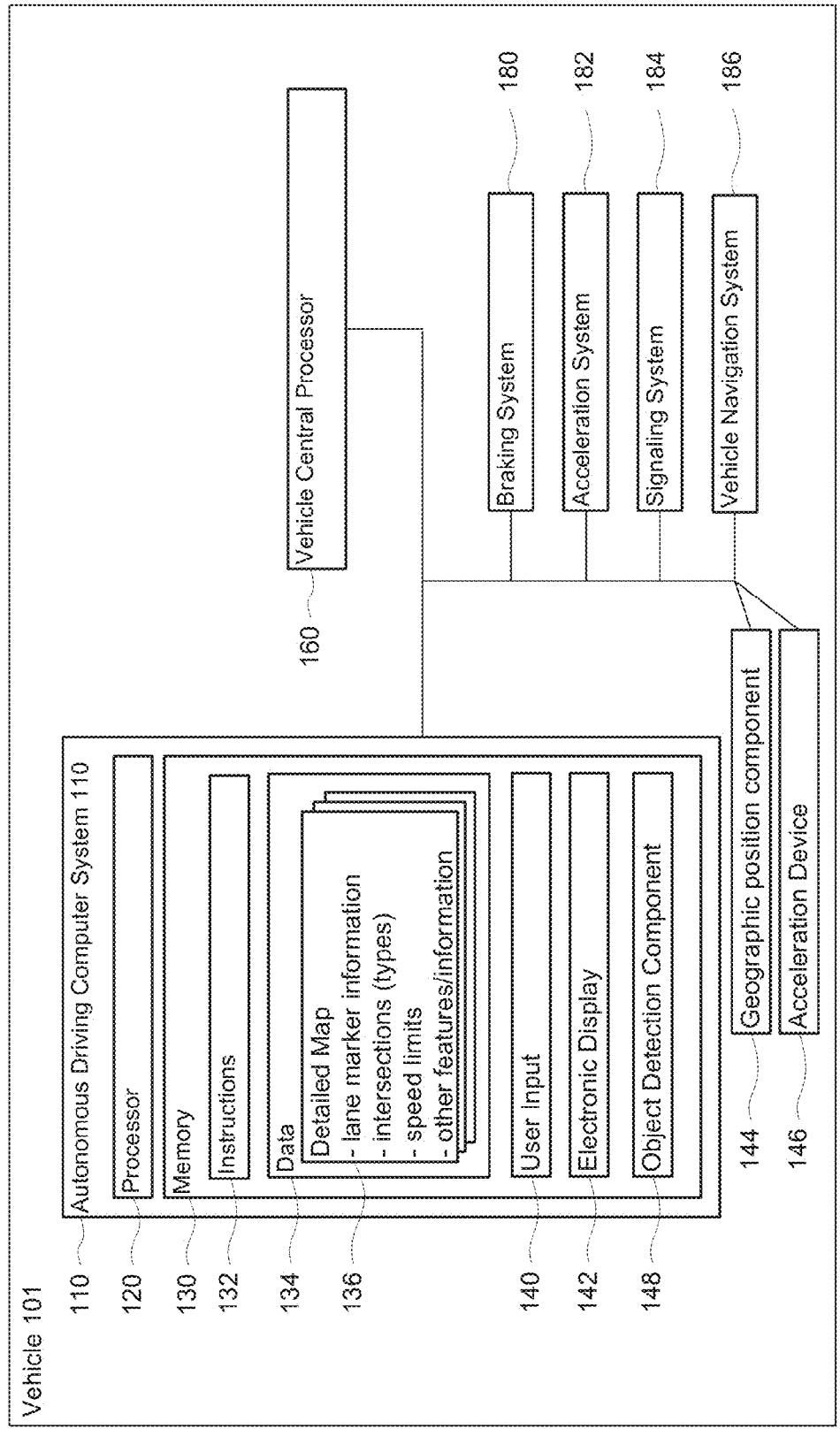
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, it will be understood that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
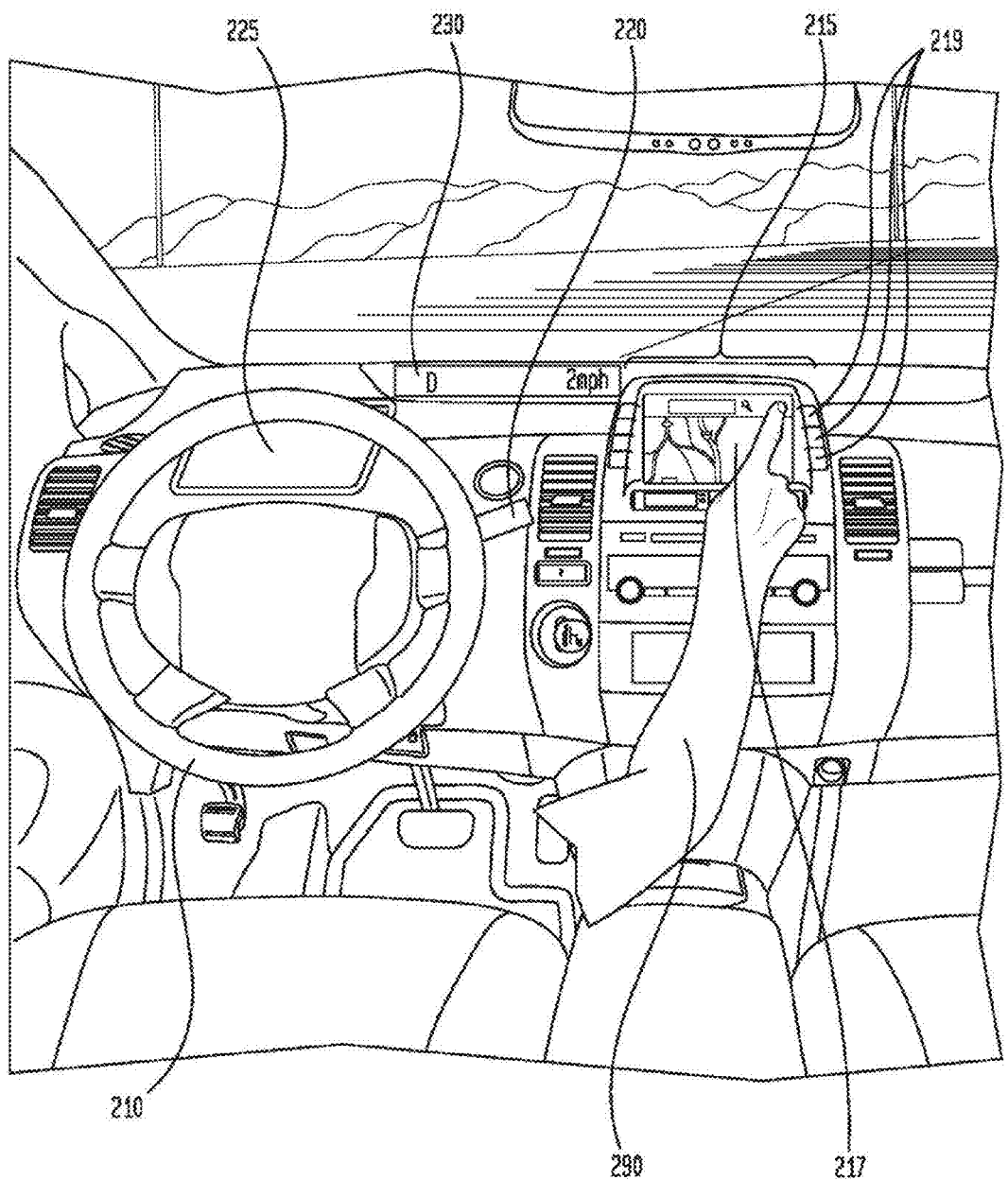
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc., of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3:
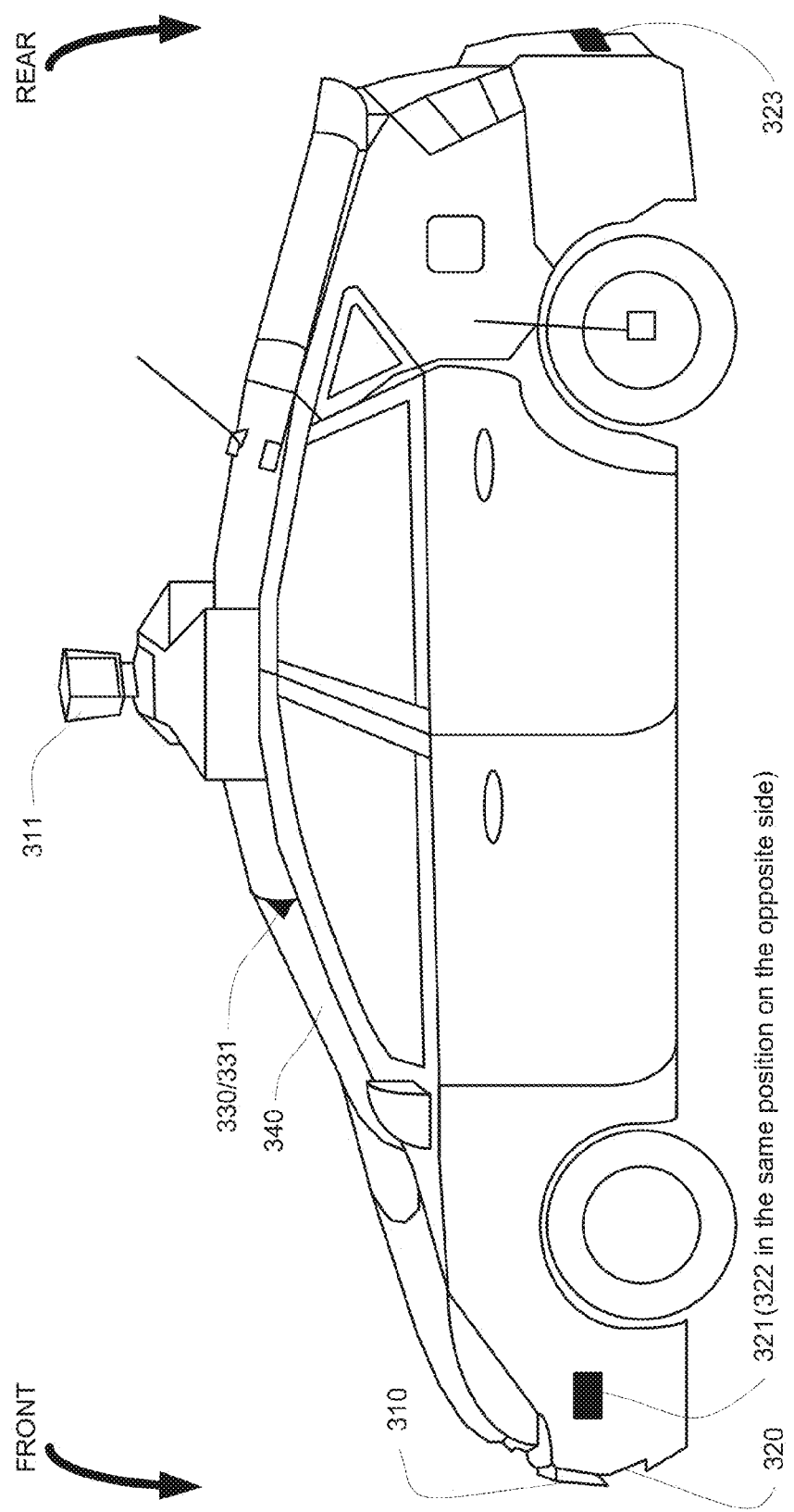
FIG. 3 is an exterior of an autonomous vehicle in accordance with aspects of the disclosure.

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location. As shown in FIG. 3, vehicle 101 may comprise a small passenger vehicle. In this example, vehicle 101 sensors may include lasers 310 and 311, mounted on the front and top of the vehicle, respectively. The lasers may include commercially available lasers such as the Velodyne HDL-64 or other models. In one aspect, the laser may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 301 includes radar detection units 320-323 located on the side (only one side being shown), front and rear of the vehicle.

In another example, a variety of cameras may be mounted on the vehicle. The cameras may be mounted at predetermined distances so that the parallax from the images of 2 or more cameras may be used to compute the distance to various objects. As shown in FIG. 3, vehicle 301 may include 2 cameras 330-331 mounted under a windshield 340 near the rear view mirror (not shown).

Though not depicted in the example of FIG. 3, vehicle 101 may have a variety of other sensors, including, for example, sonar. The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, intersections, crosswalks, speed limits, traffic signals, buildings, signs, real time traffic information, or other such objects and information.

The detailed map information 136 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane.

Figure 4:
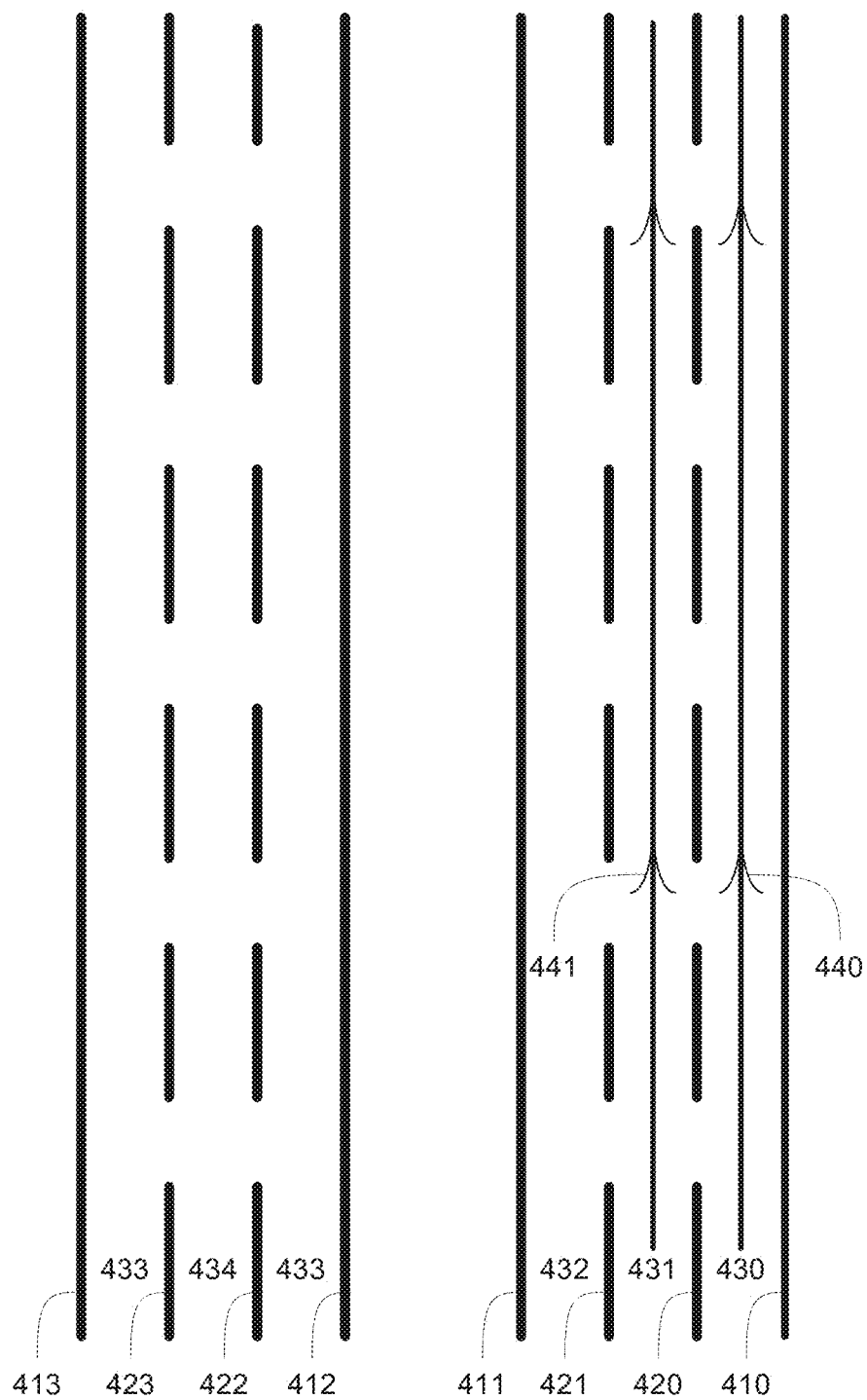
FIG. 4 is a diagram of map information in accordance with aspects of the disclosure.

FIG. 4 depicts a detailed map 400 including an example section of a roadway. The detailed map of the section of roadway includes information such as solid lane lines 410-13 and broken lane lines 420-23. These lane lines define lanes 430-35. Each lane may be associated with a rail, such as rails 440 and 441, which indicates the direction in which a vehicle should generally travel in the respective lane. For example, a vehicle may follow rail 440 when driving along lane 430.

Again, although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 5:
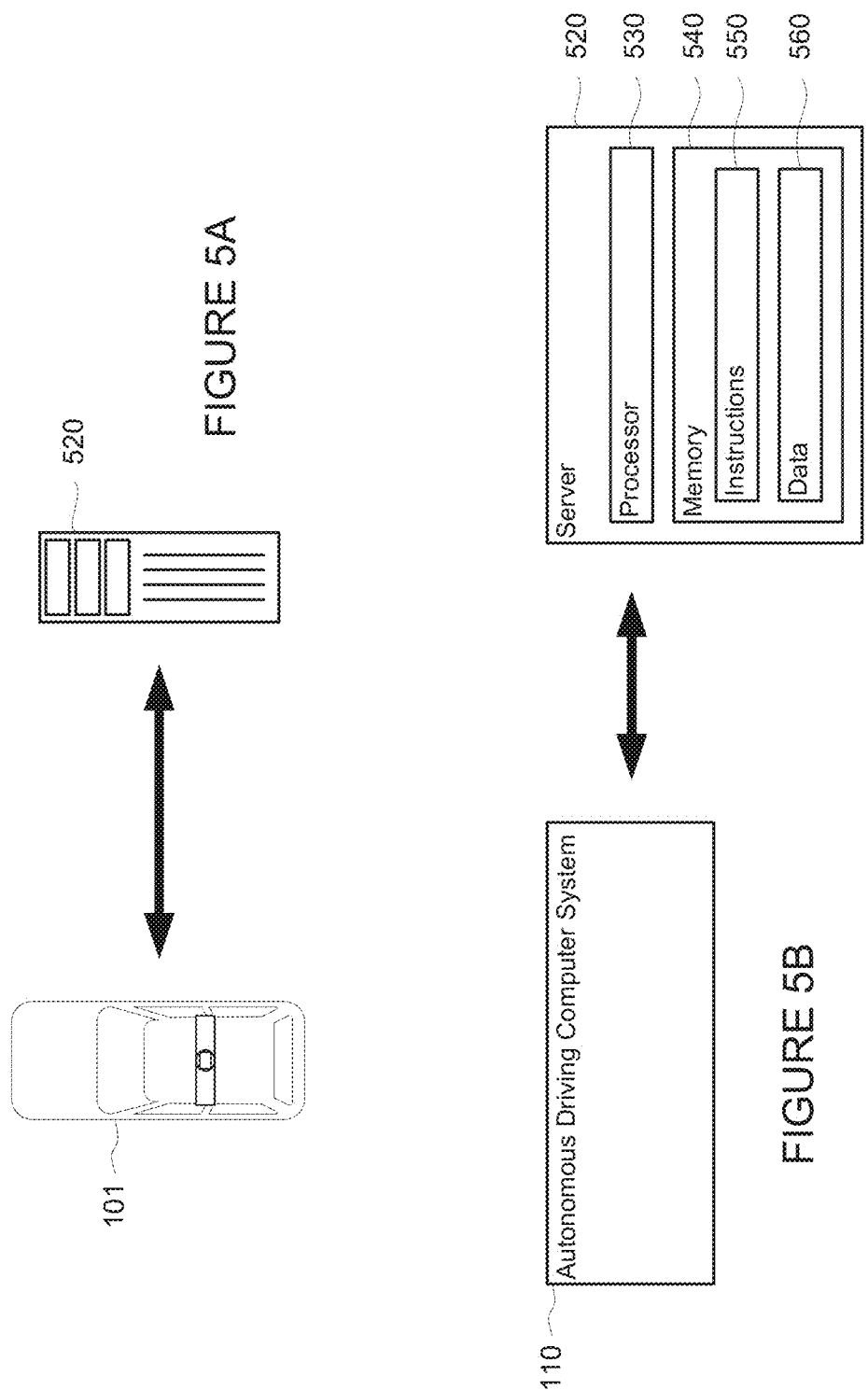
FIG. 5A is a pictorial diagram of a system in accordance with aspects of the disclosure.
FIG. 5B is a functional diagram of a system in accordance with aspects of the disclosure.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 5A and 5B, data from computer 110 may be transmitted via a network to computer 520 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 520.

In one example, computer 520 may comprise a server having a plurality of computers, e.g., a load balanced server farm, that exchange information with different nodes of a network for the purpose of receiving, processing and transmitting the data from computer 110. The server may be configured similarly to the computer 110, with a processor 530, memory 540, instructions 550, and data 560.

Returning to FIG. 1, instructions 132 may include various algorithms. In one example, the instructions may include blind spot algorithms. This algorithm may be used to identify other vehicles that are likely to be associated with a blind spot. Again, in addition to an area in which a driver of the given vehicle is unable to see another vehicle by looking through a windshield, rear or side view mirrors, etc., a blind spot for a given vehicle may actually include any area in which another human driver would feel uncomfortable driving or in which the driver of the given vehicle would feel uncomfortable. The blind spot algorithms may also be used to determine the size, shape and location of a blind spot area for a vehicle. These algorithms may consider information such as the estimated speed, size, heading, location (absolute and relative to vehicle 101), type etc. of another vehicle in order to identify the size and shape of the blind spot.

In another example, instructions 132 may include prediction algorithms. These prediction algorithms may be used to determine the future location of an object given the objects current (or recent) estimations of location, heading, speed, size, object type etc. These algorithms may also consider the detailed map information 136, such as lanes, speed limits, etc., to make predictions.

In yet another example, the instructions may include speed algorithms. Various approaches may be used, but the output of these algorithms is used by the computer 110 to control the braking and acceleration of the vehicle 101. The input to the speed algorithms used by computer 110 may include a set of controlling factors. An example of a speed control algorithm are those used in adaptive cruise control systems. The controlling factors these systems may include cruise-control speed chosen by the driver as well as the speed and distance of other cars in the same lane. In the example of vehicle 101 and computer 110, the controlling factors may include additional information such as information from the detailed map information for a particular section of roadway such as the curvature and/or elevation of the road, speed limits, etc. In addition, these controlling factors may also include information determined from the sensor data such as the number of objects on the roadway, characteristics of those other objects (speed, size, type, heading, etc.), minimum distances from the vehicle 101 to other objects, blind spot calculations (as described in more detail below), etc. In some example, the controlling factors may also include the preferences of the driver, such as whether the driver prefers a more aggressive or more cautious approach to driving, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
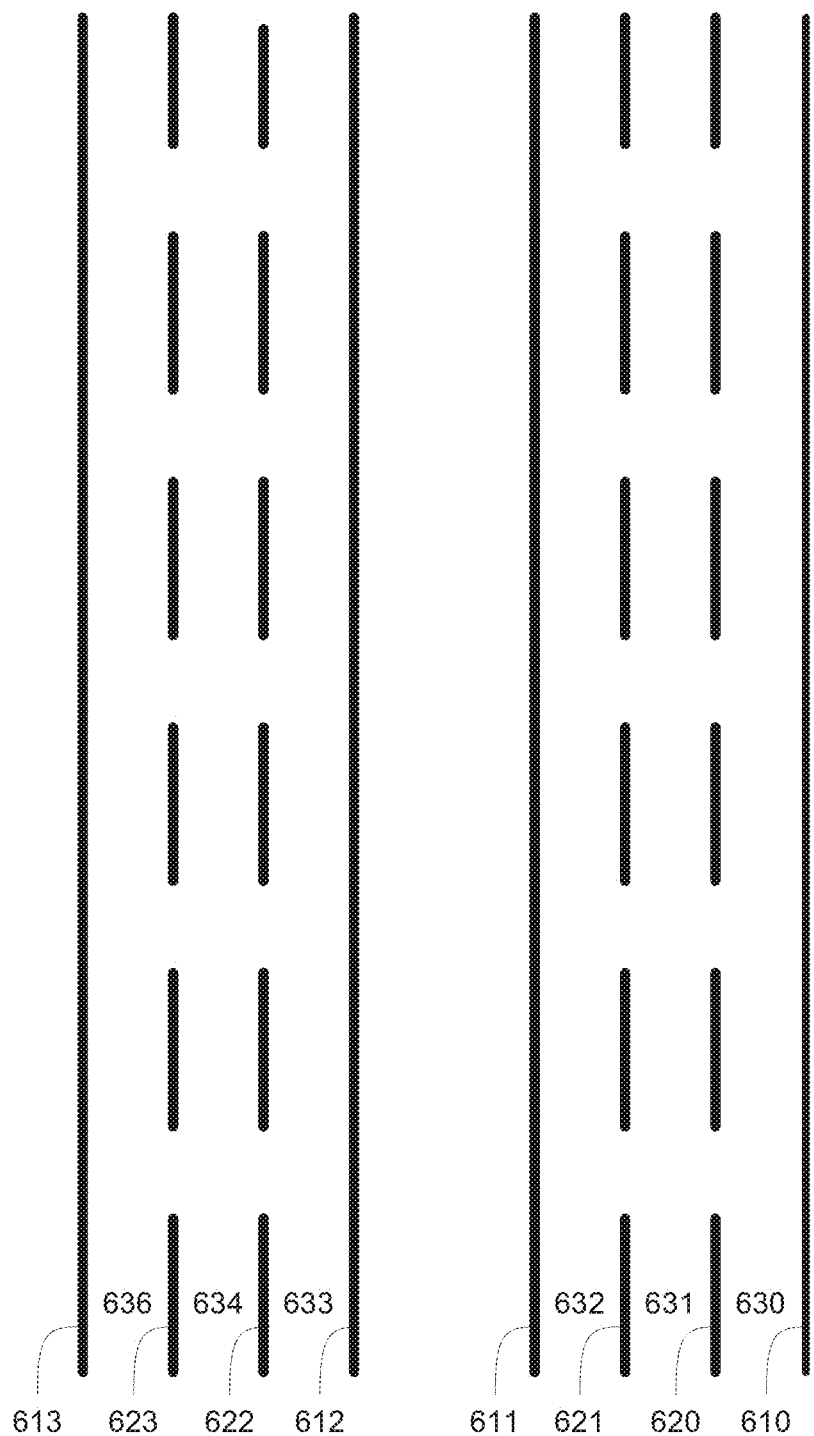
FIG. 6 is a diagram of a roadway in accordance with aspects of the disclosure.
Figure 7:
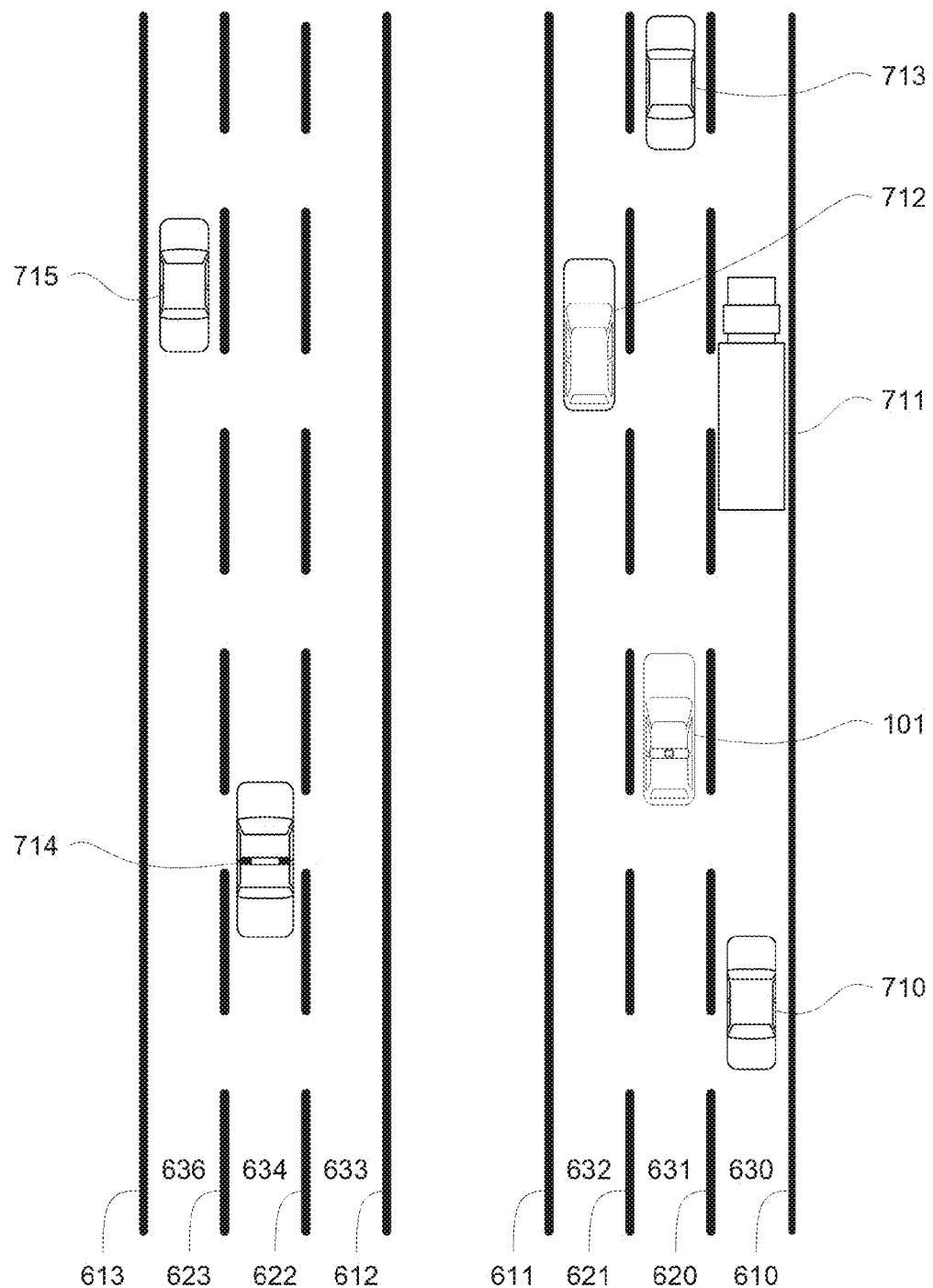
FIG. 7 is a diagram of laser scan data in accordance with aspects of the disclosure.

A vehicle including one or more sensors may be driven along a roadway. For example, the sensors may be an off board sensor attached to a typical vehicle or a part of an autonomous driving system, such as vehicle 101. FIG. 6 depicts a section of the roadway 600 corresponding to the detailed map information 400 of FIG. 4. In this example, the roadway includes as solid lane lines 610-13 and broken lane lines 620-23 (corresponding to solid lane lines 410-13 and broken lane lines 420-23 of map information 400). These lane lines define lanes 630-35 (corresponding to lanes 430-35). FIG. 7 is an example of roadway 600 as vehicle 101 drives along it. In this example, various other vehicles are also driving along the roadway. For example, vehicles 710-13 are driving in lanes 630-32 with the same heading as vehicle 101 while vehicles 714-15 are driving in lanes 633-34 with the opposite heading as vehicle 101.

Figure 8:
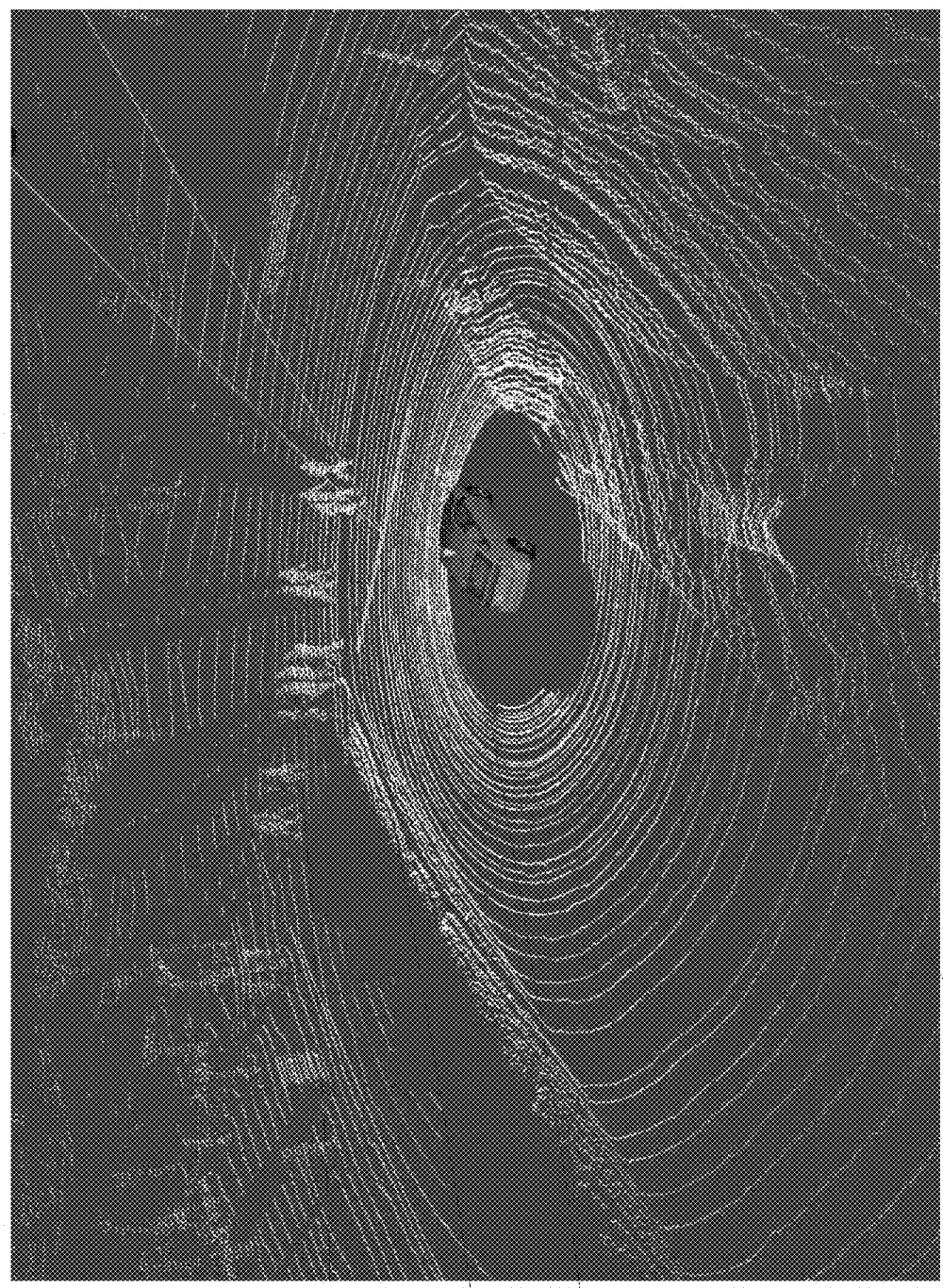
FIG. 8 is an example vehicle on a roadway in accordance with aspects of the disclosure.

As the vehicle's sensors are moved along, the sensors may collect sensor data about the vehicle's surroundings. For example, computer 110 may receive data from one or more lasers, sonar devices, radar units, cameras, or other detection devices. This data may be processed to identify the location and characteristics of objects, features, surfaces, etc. external to vehicle 101. In one example, laser scan data may include data points having range and intensity information for the same location (point or area) from several directions and/or at different times. FIG. 8 depicts an exemplary image 800 of vehicle 101 approaching an intersection. The image was generated from laser scan data collected by the vehicle's lasers for a single 360 degree scan of the vehicle's surroundings, for example, using the data points of all of the beams of the collecting laser(s). The white lines represent how the laser "sees" its surroundings. When the data points of a plurality of beams are considered together, the data points may indicate the shape and three-dimensional (3D) location (x,y,z) of other items in the vehicle's surroundings. For example, the laser scan data may indicate the outline, shape and distance from vehicle 101 of various objects such as people 810, vehicles 820, and curb 830. A similar scene, though with different features, could be generated by the data collected while vehicle 101 drives along roadway 600.

Figure 9:
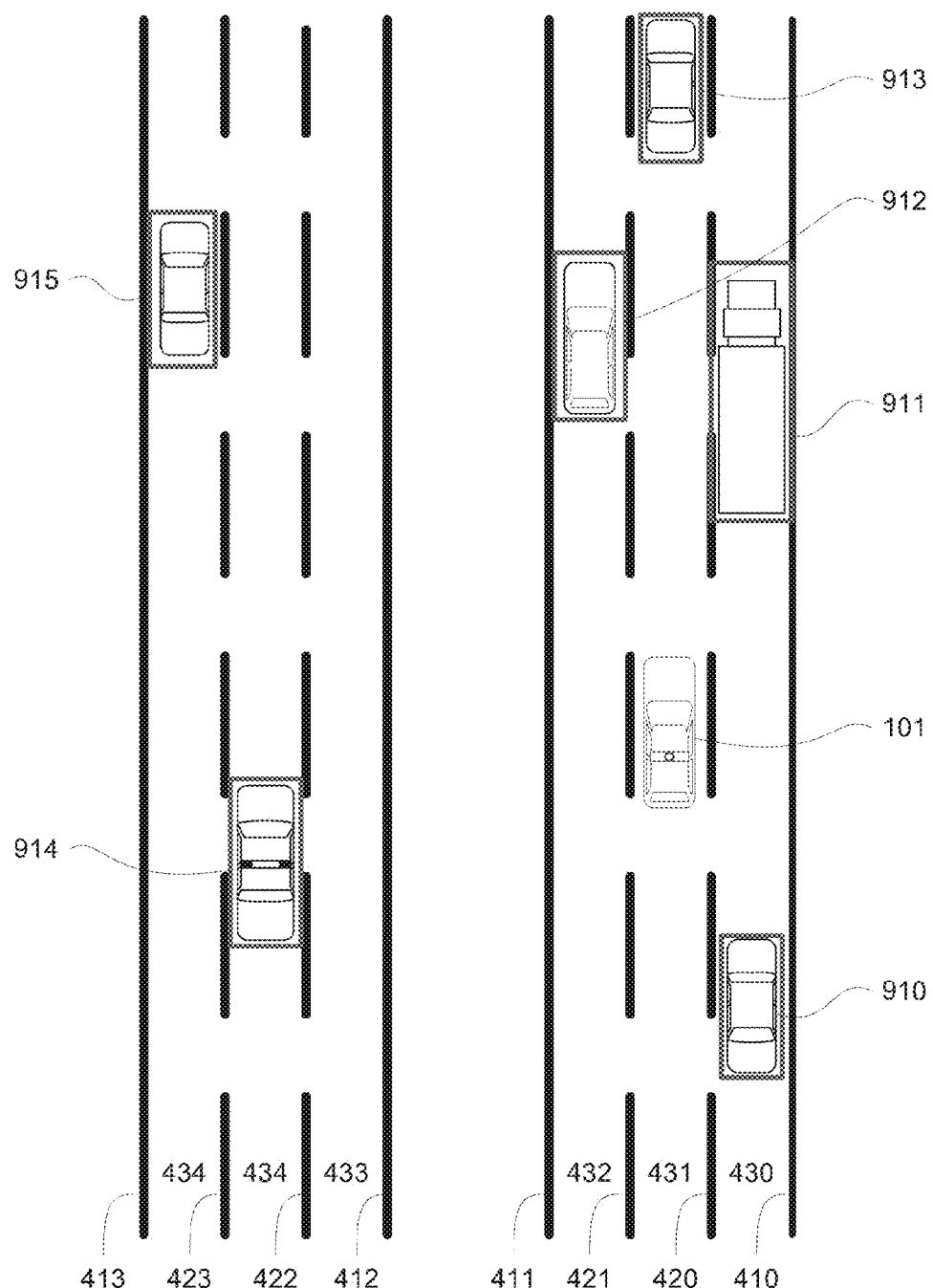
FIG. 9 is an example diagram of data collected from the example of FIG. 8 in accordance with aspects of the disclosure.

Computer 110 receives the sensor data and uses it to identify roadway features (lane markers, curbs, road surface, etc.) as well as other objects. For example, computer 110 may estimate the characteristics of other objects in the roadway including the size, shape, and location of other objects as well as heading and speed. In some examples, computer 110 may use these characteristics to estimate an object type based on expected characteristics for different object, image matching techniques, or other identification methods. For example, FIG. 9 is an example of the map information 400 for roadway 600 having a set of bounding boxes 910-915 representing some of the characteristics determined from the laser scan data associated with vehicles 710-15.

Figure 10:
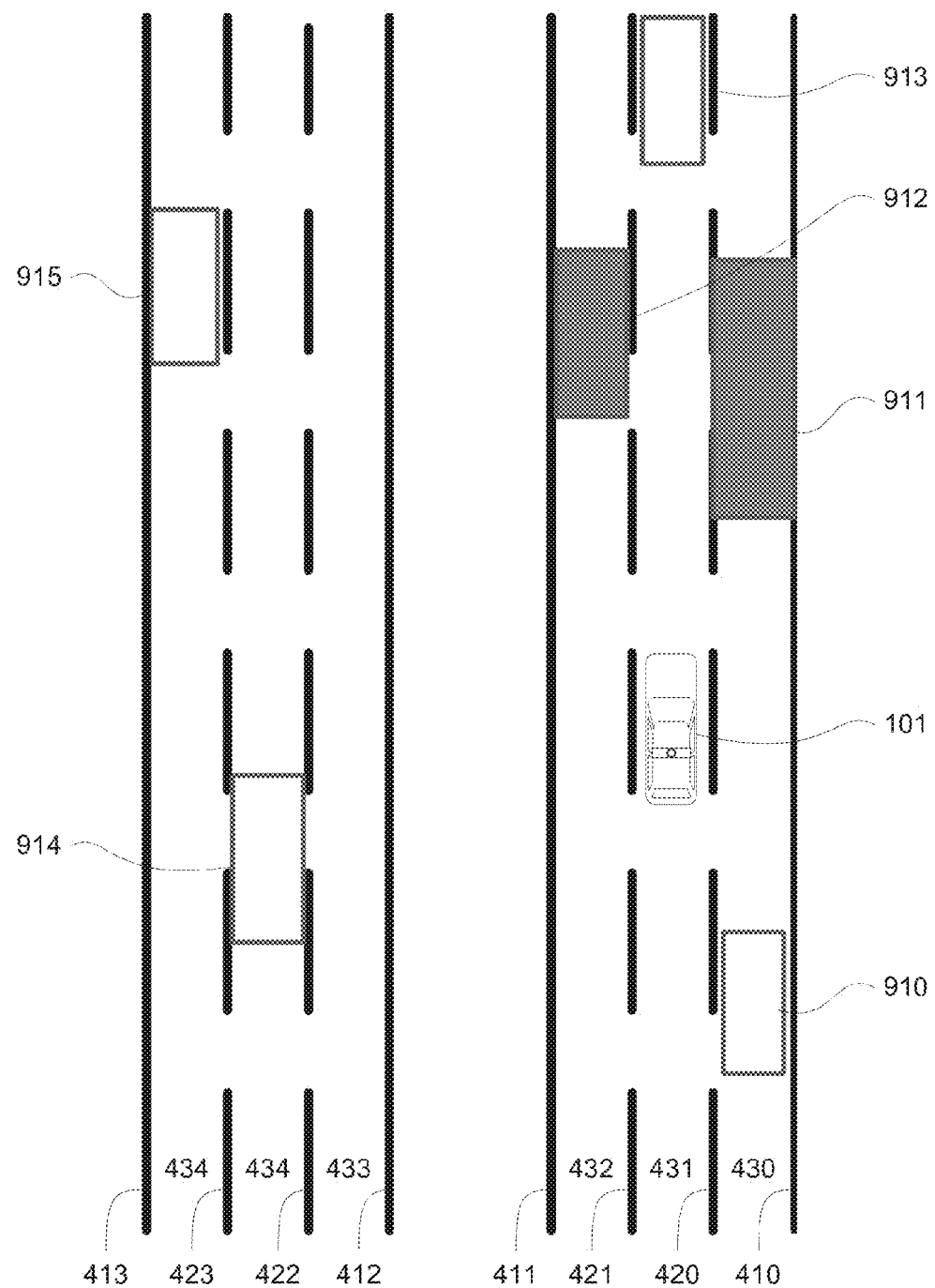
FIG. 10 is an example diagram of data collected from the example of FIG. 8 in accordance with aspects of the disclosure.

Computer 110 may identify a set of the objects that are relevant for blind spot detecting using the blind spot algorithms as described above. This may include identifying objects ahead of and/or adjacent to the vehicle 101 that following the same general heading (in the same direction of traffic flow) as well as objects that are traveling at a similar speed (or within some threshold speed difference from the absolute speed of the autonomous vehicle). For example, as shown in FIG. 10 bounding boxes 911-12 are highlighted as two objects relevant for blind spot detection. For example, vehicle 711 of FIG. 7 is represented by bounding box 911 in FIG. 9, which is located ahead of vehicle 101, in adjacent lane 410 (610), and heading in the same general direction as vehicle 101. Similarly, vehicle 712 of FIG. 7 is represented by bounding box 912 of FIG. 9, which is located ahead of vehicle 101, in adjacent lane 412 (612), and heading in the same general direction as vehicle 101. In this regard, computer 110 may identify a set of objects relevant for blind spot detecting including the objects represented by bounding boxes 911 and 912.

For these identified objects, computer 110 may determine the blind spot areas for each object using the blind spot algorithms. Again the blind spot of a vehicle may be any location which would be considered by an individual to be an unnatural, unnerving, or uncomfortable position relative to another vehicle and not simply a relative position of poor visibility, thus this determination may be based on any number of factors including the estimated size, shape, location (absolute and relative to vehicle 101), heading, and speed. Thus, a typical blind spot area for a given vehicle may be at least in part in an adjacent lane that corresponds to the lane in which vehicle 101 is driving. In addition, the blind spot area may be positioned alongside a given vehicle, and not necessarily behind the given vehicle. In such a case, this "behind area" would comprise as a simple minimum following distance between the back of the given vehicle and vehicle 101 and not a "blind spot area".

Figure 11:
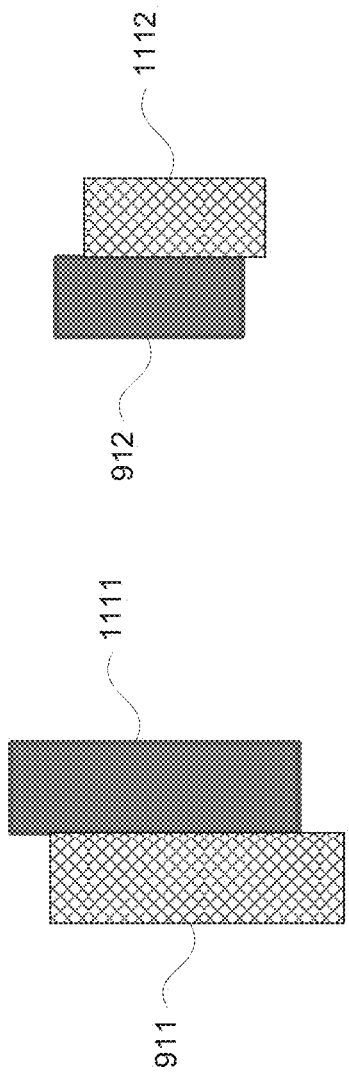
FIGS. 11A and 11B are examples of objects and blind spots in accordance with aspects of the disclosure.

For example, as shown in FIGS. 11A and 11B, computer 110 may determine blind spot areas 1111 and 1112 for the objects represented by bounding boxes 911 and 912. In this example, both objects may be moving with the same heading, but the object represented by bounding box 911 may be moving faster than the object represented by bounding box 912. As the object represented by bounding box 911 is somewhat larger than the object represented by bounding box 912, blind spot area 1111 is somewhat larger than bounding box 1112. In addition, though not shown in with respect to map information 400 in FIGS. 11A and 11B, while both objects are in adjacent lanes to vehicle 101, the blind spot areas for these vehicles may both be in lane 431, as this is the lane where vehicle 101 is currently driving.

Figure 12:
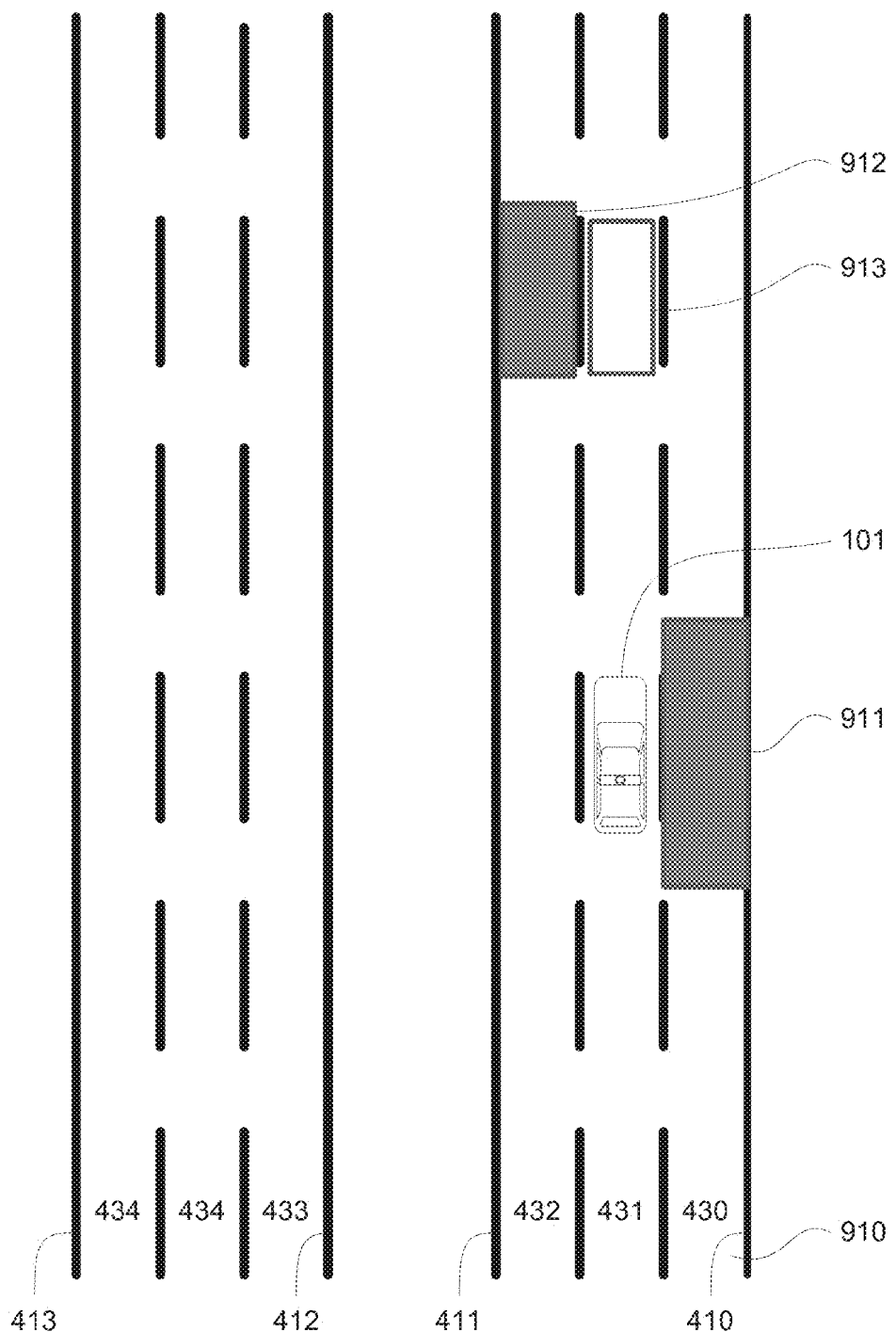
FIG. 12 is an example diagram of prediction data in accordance with aspects of the disclosure.

Assuming that vehicle 101 would not be affected by other vehicle's blind spots, computer 110 may predict the future locations of the autonomous vehicle and the identified objects. For example, FIG. 12 is a diagram of the predicted location of the objects in lanes 430-32 at some section of map information 1200 further from the section of roadway 600 in the direction of vehicle 101's heading. In this example, while all of the objects in this examples have changed locations, vehicle 101 has moved adjacent to the object represented by bounding box 911 and has moved closer to the object represented by bounding box 913. In addition, the objects represented by bounding boxes 912 and 913 are also adjacent to one another.

Figure 13:
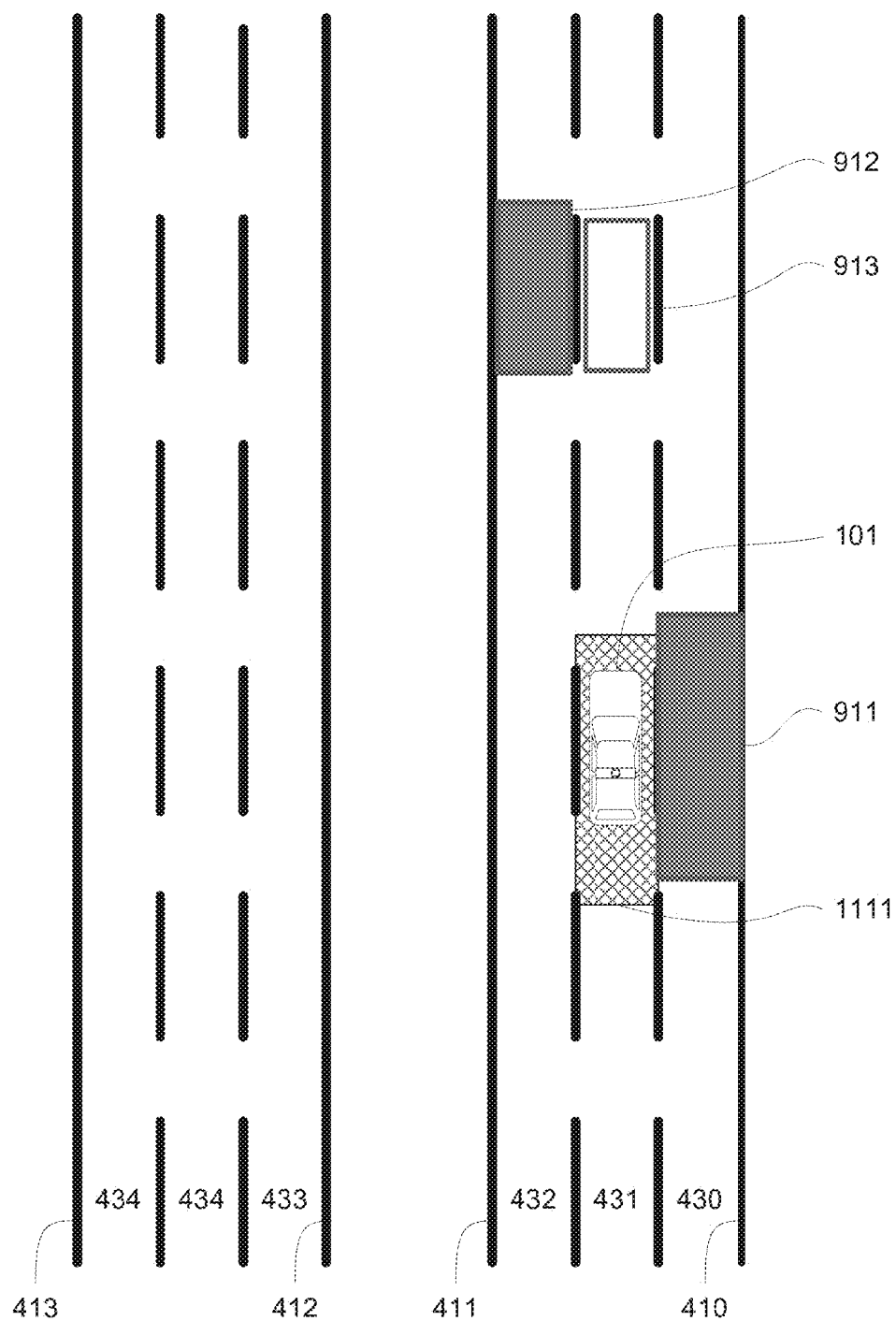
FIG. 13 is another example diagram of prediction data in accordance with aspects of the disclosure.

Using the predictions, computer 110 may determine whether the autonomous vehicle would drive in any of the determined blind spot areas of the identified vehicles. For example, FIG. 13 depicts the same map information as FIG. 12, however, in FIG. 13, blind spot areas 1111 and 1112 are also depicted. In this example, vehicle 101 is predicted to move into the determined blind spot area of the object represented by bounding box 911. While in this example, vehicle 101 is completely within the blind spot area 1111, other situations, such as where a vehicle would pass through only a portion of a determined blind spot area for a threshold period of time, for example, a few seconds, may also be considered as driving in a blind spot.

In this regard, the prediction determination may involve calculating the predicted locations of the various objects for a finite period and subsequently examined to determine whether vehicle 101 would drive in any of the determined blind spots. This period may be a fixed value, for example at least 10 seconds, or may be variable value, for example where the period is greater for faster speeds and less for slower speeds. In another example, the prediction determinations may be made for some finite prediction period (and then begin again with updated information) or until the computer 110 determines that vehicle 101 would drive in any of the determined blind spots.

When computer 110 determines that vehicle 101 would drive in any of the determined blind spot areas, for each determined blind spot, computer 110 may generate an additional controlling factor for the speed algorithms. This additional controlling factor may be input into the speed algorithms (along with the other controlling factors) and the output used by computer 110 to control to the speed of vehicle 101. For example, the additional controlling factor may include a set of constraints or penalties restricting vehicle 101's time in any of the determined blind spots. In one example, the controlling factors may include various high-level factors. For example, the occupants of an autonomous vehicle may be more sensitive to spending time in a blind spot of a larger truck than a smaller sedan. This information may be included in the structure of the penalty function of the controlling factor. This may allow computer 110 to gradually adjust its speed to avoid or limit vehicle 101's time in any of the determined blind spots of the identified vehicles.

Figure 14:
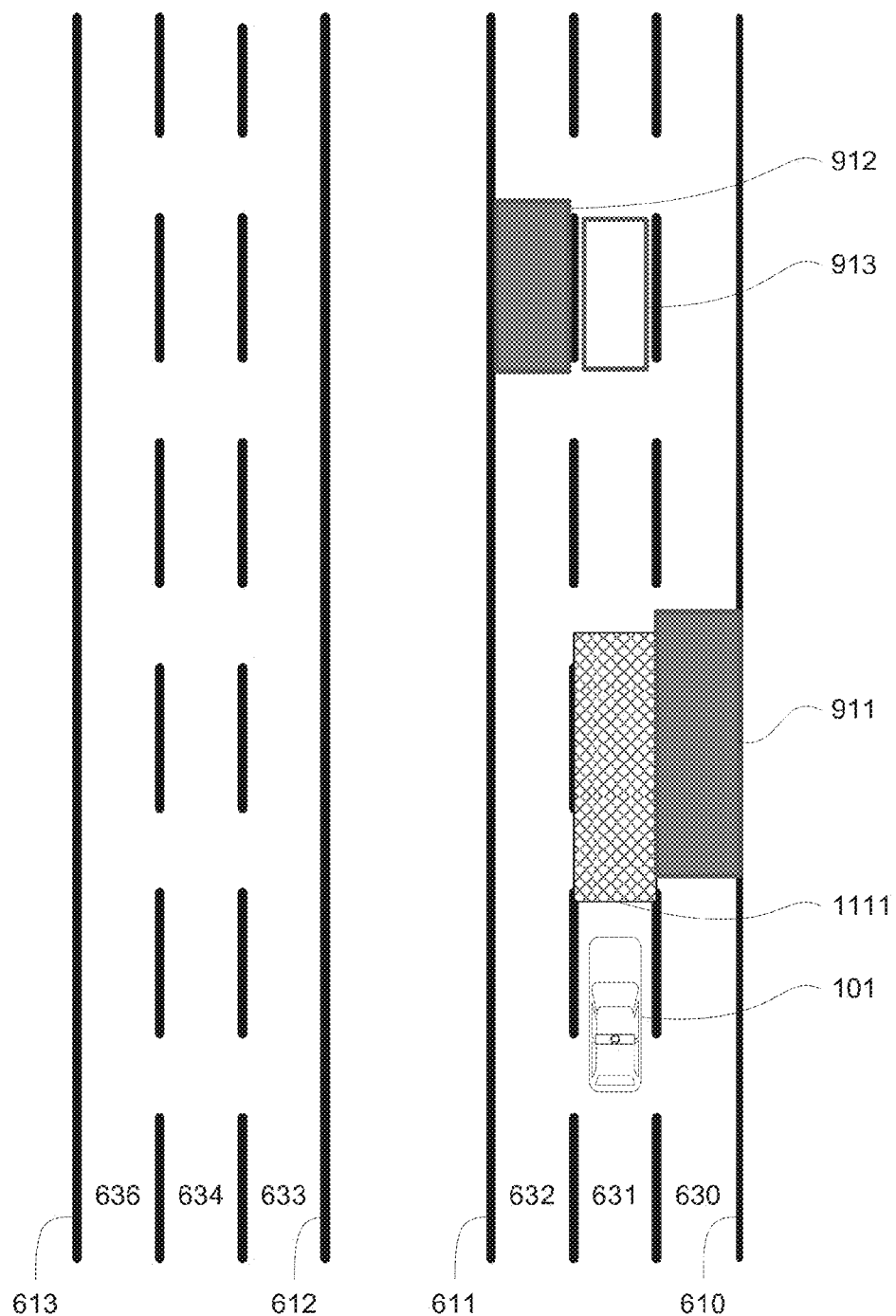
FIG. 14 is a further example diagram of data in accordance with aspects of the disclosure.

In one example, in light traffic, when driving close to the speed limit with another vehicle in an adjacent lane also driving close to the same speed, computer 110 may stay a certain distance behind the car in the adjacent lane in order to avoid the blind spot. For example, FIG. 14 depicts one possible outcome of the speed algorithms based on the constraints generated from the examples of FIGS. 12 and 13. Here, computer 110 has slowed down to a safe distance behind the object represented by bounding box 911 in an adjacent lane. Thus, vehicle 101 will not actually drive in the blind spot area 1111. In another example, vehicle 101 may be following another vehicle in the same lane that is slowly overtaking another vehicle in an adjacent lane. In this example, the speed algorithms may cause computer 110 to reduce the speed of vehicle 101 and "stay back" until the other vehicle ahead completely overtakes the vehicle in the adjacent lane. Once there is enough room for vehicle 101 to speed up and compete the pass without violating the desired headway distance to the car ahead. This may be a very useful behavior when overtaking larger objects such as trucks.

Although computer 110 may predict that vehicle 101 is likely to pass through only a single one of the determined blind spot areas, the more of the determined blind spot areas that are considered in the constraints for the speed algorithm, the more likely computer 110 will be able to avoid blind spots. For example, avoiding a given blind spot may place the autonomous vehicle in another if only that given blind spot is taken into consideration. However, these determinations need not take into consideration those objects that would be irrelevant for blind spot detecting such as those objects in a lane with a heading opposite of vehicle 101 (e.g. they are in a north-bound lane while vehicle 101 is in a south-bound lane), those objects in the same lane as vehicle 101, as well as those objects that are some distance behind vehicle 101. This may substantially reduce the amount of calculations and determinations made by computer 110 while still at the same time allowing for safe maneuvering of vehicle 101.

By estimating and attempting to avoid blind spots of other vehicles computer 110 may not only keep a driver and any passengers safe, but may also allow them to feel safer. Such actions make vehicle 101 "smarter" and able to provide a more natural driving experience than an autonomous (or semiautonomous) vehicle that considers primarily vehicles ahead of it in its own lane.

Figure 15:
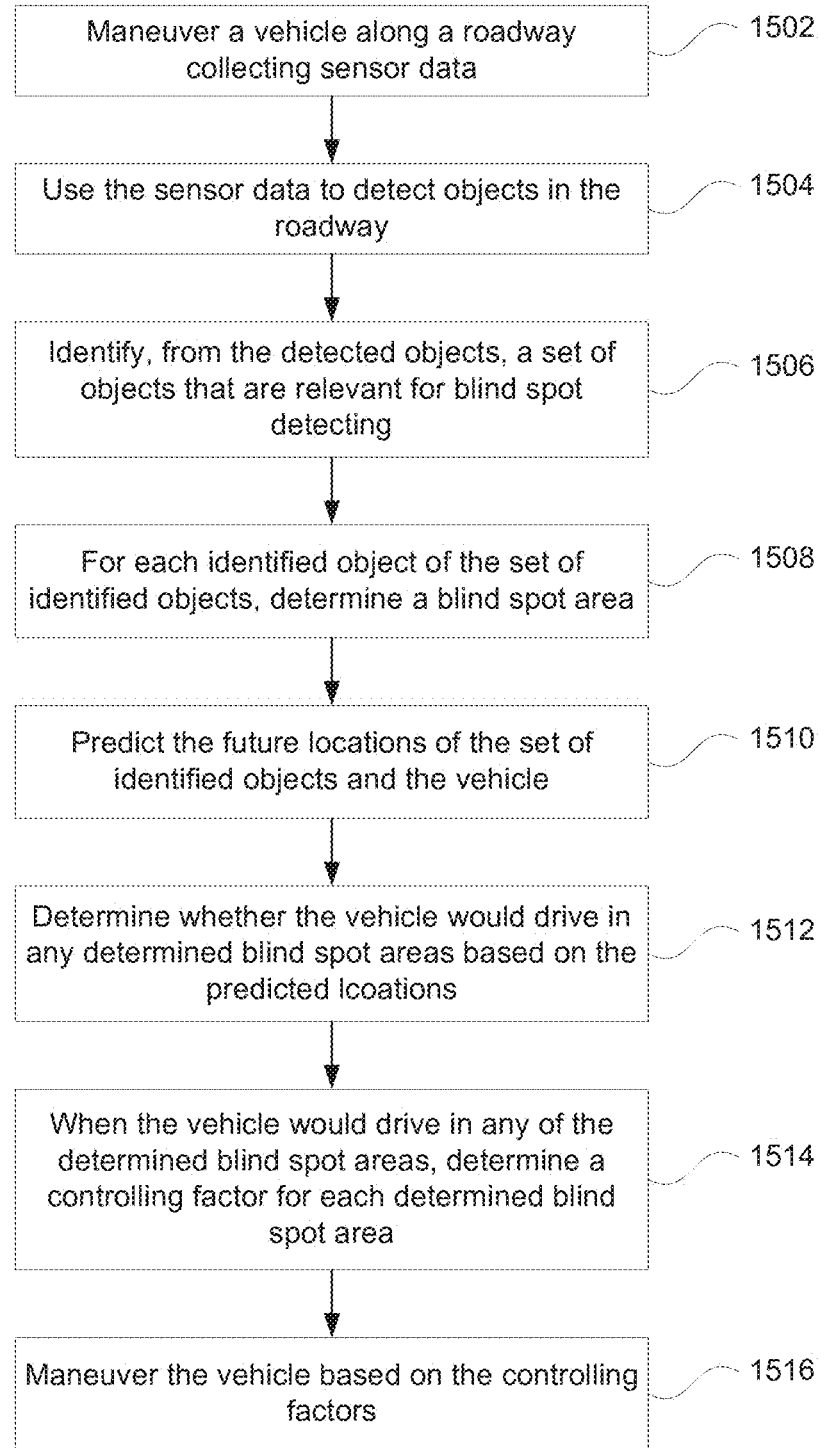
FIG. 15 is a flow diagram in accordance with aspects of the disclosure.

Flow diagram 1500 of FIG. 15 is an example of some of the steps described above performed by computer 110. In this example, a vehicle is maneuvered along a roadway collecting sensor data at block 1502. The sensor data is used to detect objects in the roadway at bock 1504. A set of objects that are relevant for blind spot detection are identified from the detected objects, for example, using some of the techniques described above, at block 1506. For each identified object of the set of identified objects, a blind spot area is determined at block 1508. This blind spot area may be based on the estimated characteristics of the object, such as the size, shape, location, type, etc. The future locations of the set of identified objects and the vehicle are predicted at block 1510. Using the predicted future locations, whether the vehicle would drive in any of the determined blind spots is determined at block 1512. Again, driving in the determined blind spot may involve determining whether the vehicle would pass through all or a portion of the blind spot area more than some maximum or threshold period of time. When the vehicle would drive in any of the determined blind spot areas, a controlling factor is determined for each determined blind spot area at block 1514. Again these controlling factors may be a set of constraints or penalties which are input into a speed algorithm for the vehicle. The vehicle is then maneuvered based on the controlling factors, for example the output of the speed algorithm, at block 1516.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   detecting, by the one or more processors, objects in a roadway based on the sensor data collected along the roadway by sensors of a vehicle driving in an autonomous driving mode;
   identifying, by the one or more processors, from the detected objects, a particular object of the objects in the roadway that are located in a lane adjacent to a lane of the vehicle for blind spot detection;

determining, by the one or more processors, a blind spot area that defines a space in the lane of the vehicle that is adjacent to the particular object;

predicting, by the one or more processors, future locations of the particular object;

determining, by the one or more processors, whether the predicted future locations indicate that the vehicle will drive into the determined blind spot area;

when the predicted future locations indicate that the vehicle will drive into the determined blind spot area, determining, by one or more processors, a controlling factor for the blind spot area including a restriction on an amount of time spent by the vehicle in the determined blind spot area when the vehicle is in the determined blind spot area; and maneuvering, by the one or more processors, the vehicle based on the controlling factor.

2. The method of claim 1, further comprising, for the particular object, determining a set of estimated characteristics, including one or more of the size, shape, location, and type of object.

3. The method of claim 2, wherein identifying the particular object is based on the set of estimated characteristics of the particular object.

4. The method of claim 1, wherein determining the blind spot area for the particular object is further based on a shape or a size of the particular object.

5. The method of claim 1, further comprising:
inputting the restriction into a speed algorithm to determine speed control for the vehicle; and
wherein maneuvering the vehicle is further based on the determined speed control.

6. The method of claim 1, wherein determining the future locations is based on a threshold period of time, and the method further comprises:
after the threshold period of time, repredicting, by the one or more processors, future locations of the particular object; and
determining, by the one or more processors, whether the repredicted future locations indicate that the vehicle would drive into the determined blind spot areas.

7. The method of claim 6, further comprising:
when the repredicted future locations indicate that the vehicle would drive into the determined blind spot areas, determining a second controlling factor for the blind spot area; and
maneuvering the vehicle based on the second controlling factor.

8. A system comprising one or more processors configured to:
detect objects in a roadway based on the sensor data collected along the roadway by sensors of a vehicle driving in an autonomous driving mode;
identify a particular object of the objects in the roadway that are located in a lane adjacent to a lane of the vehicle for blind spot detection;
determine a blind spot area that defines a space in the lane of the vehicle that is adjacent to the particular object;
predict future locations of the particular object;
determine whether the predicted future locations indicate that the vehicle will drive into the determined blind spot area;
when the predicted future locations indicate that the vehicle would will drive into the determined blind spot areas, determine a controlling factor for the blind spot area including a restriction on an amount of time spent by the vehicle in the determined blind spot area when the vehicle is in the determined blind spot area; and
maneuver the vehicle based on the controlling factor.

9. The system of claim 8, wherein the one or more processors are further configured to, determine for the particular object a set of estimated characteristics, including one or more of the size, shape, location, and type of object.

10. The system of claim 9, wherein the one or more processors are further configured to identify the particular object based on the set of estimated characteristics of the particular object.

11. The system of claim 9, wherein the one or more processors are further configured to determine the blind spot area for the particular object further based on a shape or a size of the particular object.

12. The system of claim 8, wherein the one or more processors are further configured to:
input the restriction into a speed algorithm to determine speed control for the vehicle; and
maneuver the vehicle further based on the determined speed control.

13. The system of claim 8, wherein the one or more processors are further configured to:
determine the future locations based on a threshold period of time, and the method further comprises:
after the threshold period of time, repredict future locations of the particular object; and
determine whether the repredicted future locations indicate that the vehicle would drive into the determined blind spot areas.

14. The system of claim 13, wherein the one or more processors are further configured to:
when the repredicted future locations indicate that the vehicle would drive into the determined blind spot areas, determine a second controlling factor for the blind spot area; and
maneuver the vehicle based on the second controlling factor.

15. A non-transitory computer-readable storage medium on which instructions are stored, the instructions, when executed by one or more processors, cause the one or more processors to perform a method, the method comprising:
detecting objects in a roadway based on the sensor data collected along the roadway by sensors of a vehicle driving in an autonomous driving mode;
identifying, from the detected objects, a particular object of the objects in the roadway that are located in a lane adjacent to a lane of the vehicle for blind spot detection;
determining a blind spot area that defines a space in the lane of the vehicle that is adjacent to the particular object;
predicting future locations of the particular object;
determining whether the predicted future locations indicate that the vehicle will drive into the determined blind spot area;
when the predicted future locations indicate that the vehicle will drive into the determined blind spot area, determining a controlling factor for the blind spot area including a restriction on an amount of time spent by the vehicle in the determined blind spot when the vehicle is in the determined blind spot area; and
maneuvering the vehicle based on the controlling factor.

16. The medium of claim 15, wherein the method further comprises, for the particular object, determining a set of estimated characteristics, including one or more of the size, shape, location, and type of object.

17. The medium of claim 16, wherein the method further comprises identifying the particular object based on the set of estimated characteristics of the particular object.

18. The medium of claim 15, wherein the method further comprises determining the blind spot area for the particular object further based on a shape or a size of the particular object.

19. The medium of claim 15, wherein the method further comprises:
   inputting the restriction into a speed algorithm to determine speed control for the vehicle; and
   wherein maneuvering the vehicle is further based on the determined speed control.

20. The medium of claim 15, wherein the method further comprises:
   determining the future locations based on a threshold period of time:
   after the threshold period of time, repredicting, by the one or more processors, future locations of the particular object; and
   determining, by the one or more processors, whether the repredicted future locations indicate that the vehicle would drive into the determined blind spot areas.

* * * * *